United States Patent
Chin et al.

(10) Patent No.: US 9,084,184 B2
(45) Date of Patent: Jul. 14, 2015

(54) CELL RESELECTION FOR SIMULTANEOUS-LTE AND TD-SCDMA COMMUNICATIONS

(75) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 264 days.

(21) Appl. No.: 13/178,390

(22) Filed: Jul. 7, 2011

(65) Prior Publication Data

US 2013/0010656 A1    Jan. 10, 2013

(51) Int. Cl.
| | |
|---|---|
| H04J 3/00 | (2006.01) |
| H04W 4/00 | (2009.01) |
| H04W 48/18 | (2009.01) |
| H04W 36/14 | (2009.01) |
| H04W 88/06 | (2009.01) |

(52) U.S. Cl.
CPC .............. *H04W 48/18* (2013.01); *H04W 36/14* (2013.01); *H04W 88/06* (2013.01)

(58) Field of Classification Search
CPC ...... H04W 48/48; H04W 36/14; H04W 88/06
USPC ................................................. 370/280, 331
See application file for complete search history.

(56) References Cited

U.S. PATENT DOCUMENTS

| | | | |
|---|---|---|---|
| 2008/0188228 A1 | 8/2008 | Pecen et al. | |
| 2010/0130205 A1 | 5/2010 | Jung et al. | |
| 2010/0172323 A1* | 7/2010 | Rexhepi et al. | ............... 370/331 |
| 2010/0255843 A1 | 10/2010 | Huang et al. | |
| 2011/0034169 A1* | 2/2011 | Roberts et al. | ............. 455/435.3 |

(Continued)

FOREIGN PATENT DOCUMENTS

WO    2009115862 A1    9/2009

OTHER PUBLICATIONS

"3rd Generation Partnership Project; Technical Specification Group Radio Access Network; User Equipment (UE) procedures in idle mode and procedures for cell reselection in connected mode (Release 8)", 3GPP Standard; 3GPP TS 25.304, 3rd Generation Partnership Project (3GPP), Mobile Competence Centre ; 650, Route Des Lucioles ; F-06921 Sophia-Antip0lis Cedex France vol. RAN WG2, No. V8.12.0, Jun. 24, 2011, pp. 1-50, XP050553503, [retrieved on Jun. 24, 2011], p. 25, paragraph 5.2.6.1.4-p. 30.

(Continued)

*Primary Examiner* — Shripal Khajuria
*Assistant Examiner* — Farhad Ali
(74) *Attorney, Agent, or Firm* — Kristine U. Ekwueme (57) ABSTRACT

In a wireless communication system, a user equipment (UE) may be capable of communication on multiple radio access networks. A UE may be in simultaneous communication with one radio access network, such as TD-SCDMA for circuit-switched voice calls and with another radio access network, such as TDD-LTE for packet-switched data communications. When the TDD-LTE network is idle, the UE may evaluate signal strength of the respective network for potential cell reselection. The UE may measure only a serving TD-SCDMA cell for purposes of switching packet-switched service to the TD-SCDMA network, thereby avoiding a situation where the UE attempts to connect to a different TD-SCDMA cell for purposes of packet-switched communications than the cell presently affiliated with the UE for circuit-switched communications.

20 Claims, 10 Drawing Sheets

(56) References Cited

U.S. PATENT DOCUMENTS

| | | |
|---|---|---|
| 2011/0149852 A1* | 6/2011 | Olsson et al. ............... 370/328 |
| 2011/0149907 A1* | 6/2011 | Olsson et al. ............... 370/331 |
| 2011/0250888 A1* | 10/2011 | Ryu et al. ................... 455/436 |
| 2012/0269173 A1 | 10/2012 | Chin et al. |

OTHER PUBLICATIONS

International Search Report and Written Opinion—PCT/US2012/045841—ISA/EPO—Oct. 12, 2012.

* cited by examiner

CELL RESELECTION FOR SIMULTANEOUS-LTE AND TD-SCDMA COMMUNICATIONS

BACKGROUND

1. Field

Aspects of the present disclosure relate generally to wireless communication systems, and more particularly, to cell reselection in mobile devices capable of communication on multiple networks, particularly TDD-LTE and TD-SCDMA networks.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access technology or radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Packet Access (HSPA), which provides higher data transfer speeds and capacity to associated UMTS networks. HSPA is a collection of two mobile telephony protocols, High Speed Downlink Packet Access (HSDPA) and High Speed Uplink Packet Access (HSUPA), that extends and improves the performance of existing wideband protocols.

As the demand for mobile broadband access continues to increase, research and development continue to advance the UMTS technologies not only to meet the growing demand for mobile broadband access, but to advance and enhance the user experience with mobile communications.

SUMMARY

Offered is a method of wireless communication. The method includes measuring a first signal strength of only a first cell of a first radio access technology affiliated with a user equipment (UE). The method also includes measuring a second signal strength of a second cell of a second radio access technology on which the UE is camped. The method further includes comparing the first signal strength and the second signal strength. The method still further includes reselecting the first cell as a serving cell for packet-switched calls when the comparing satisfies cell reselection criteria.

Offered is an apparatus for wireless communication. The apparatus includes means for measuring a first signal strength of only a first cell of a first radio access technology affiliated with a user equipment (UE). The apparatus also includes means for measuring a second signal strength of a second cell of a second radio access technology on which the UE is camped. The apparatus further includes means for comparing the first signal strength and the second signal strength. The apparatus still further includes means for reselecting the first cell as a serving cell for packet-switched calls when the comparing satisfies cell reselection criteria.

Offered is a computer program product for wireless communication. The computer program product includes a non-transitory computer-readable medium having non-transitory program code recorded thereon. The program code includes program code to measure a first signal strength of only a first cell of a first radio access technology affiliated with a user equipment (UE). The program code also includes program code to measure a second signal strength of a second cell of a second radio access technology on which the UE is camped. The program code further includes program code to compare the first signal strength and the second signal strength. The program code still further includes program code to reselect the first cell as a serving cell for packet-switched calls when the comparing satisfies cell reselection criteria.

Offered is an apparatus for wireless communication. The apparatus includes a memory and a processor(s) coupled to the memory. The processor(s) is configured to measure a first signal strength of only a first cell of a first radio access technology affiliated with a user equipment (UE). The processor(s) is also configured to measure a second signal strength of a second cell of a second radio access technology on which the UE is camped. The processor(s) is further configured to compare the first signal strength and the second signal strength. The processor(s) is still further configured to reselect the first cell as a serving cell for packet-switched calls when the comparing satisfies cell reselection criteria.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
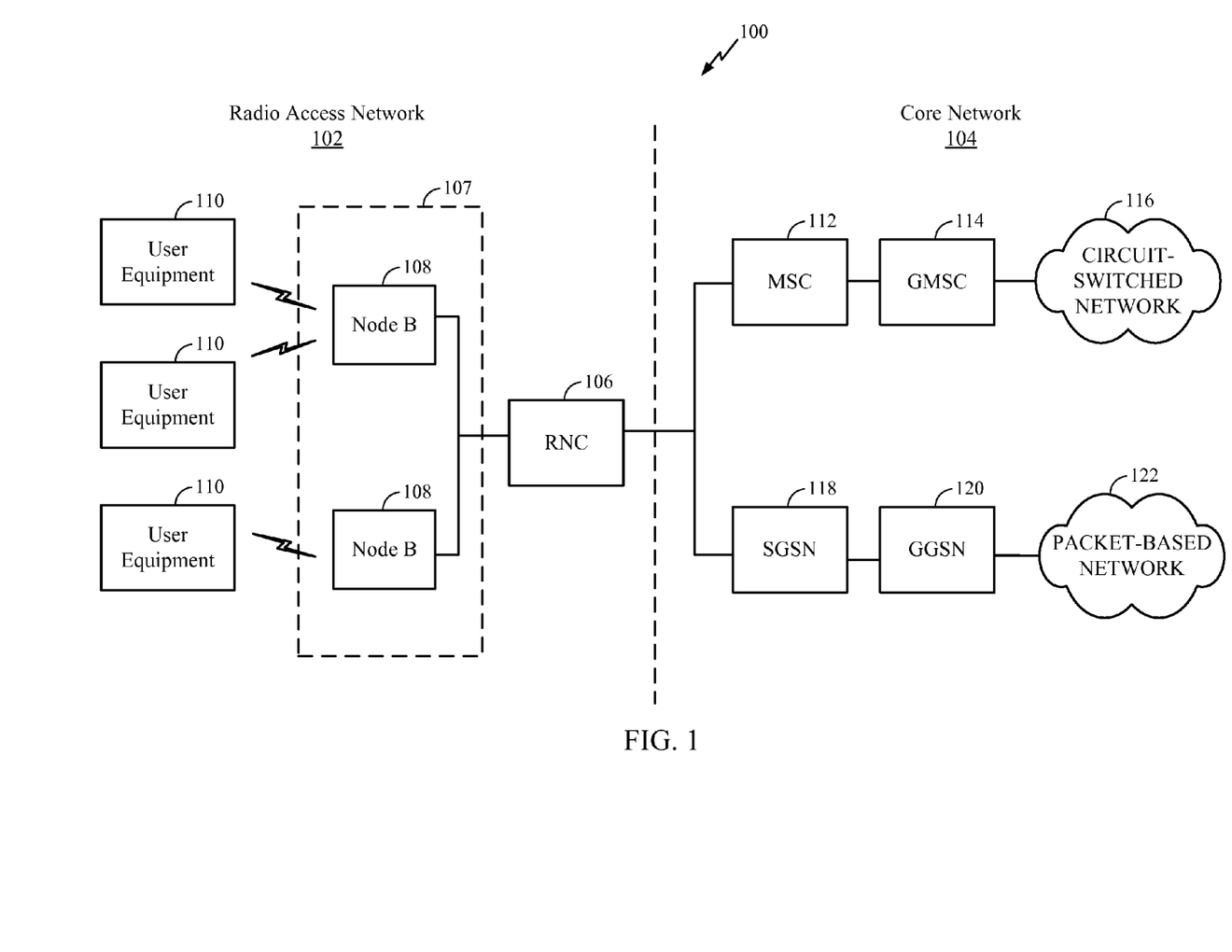
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access technology or radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two node Bs 108 are shown; however, the RNS 107 may include any number of wireless node Bs. The node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the node Bs 108. The downlink (DL), also called the forward link, refers to the communication link from a node B to a UE, and the uplink (UL), also called the reverse link, refers to the communication link from a UE to a node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a node B 108 and a UE 110, but divides uplink and downlink transmissions into different time slots in the carrier.

Figure 2:
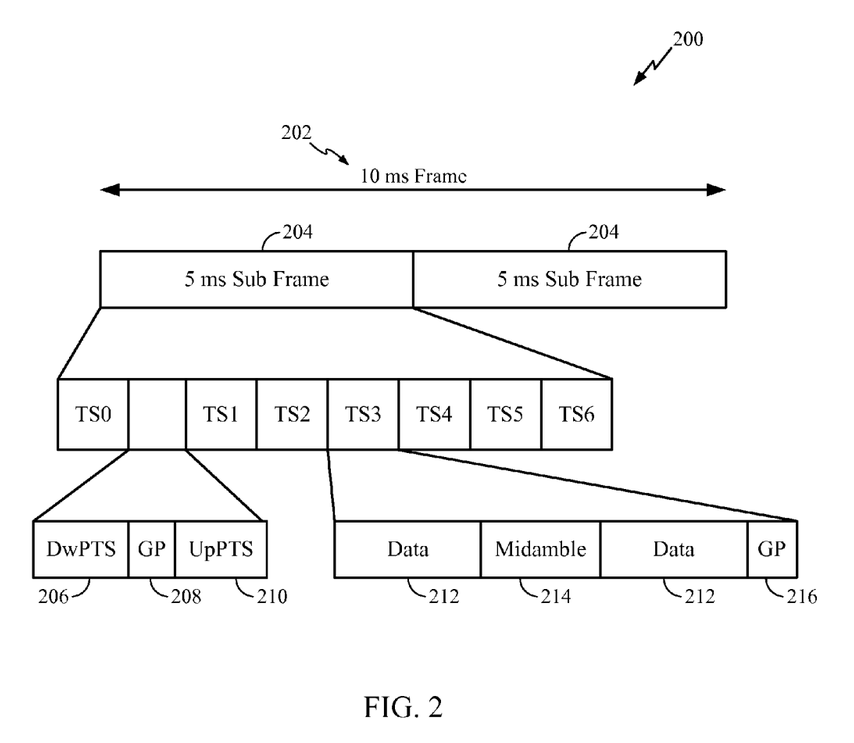
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference.

Figure 3:
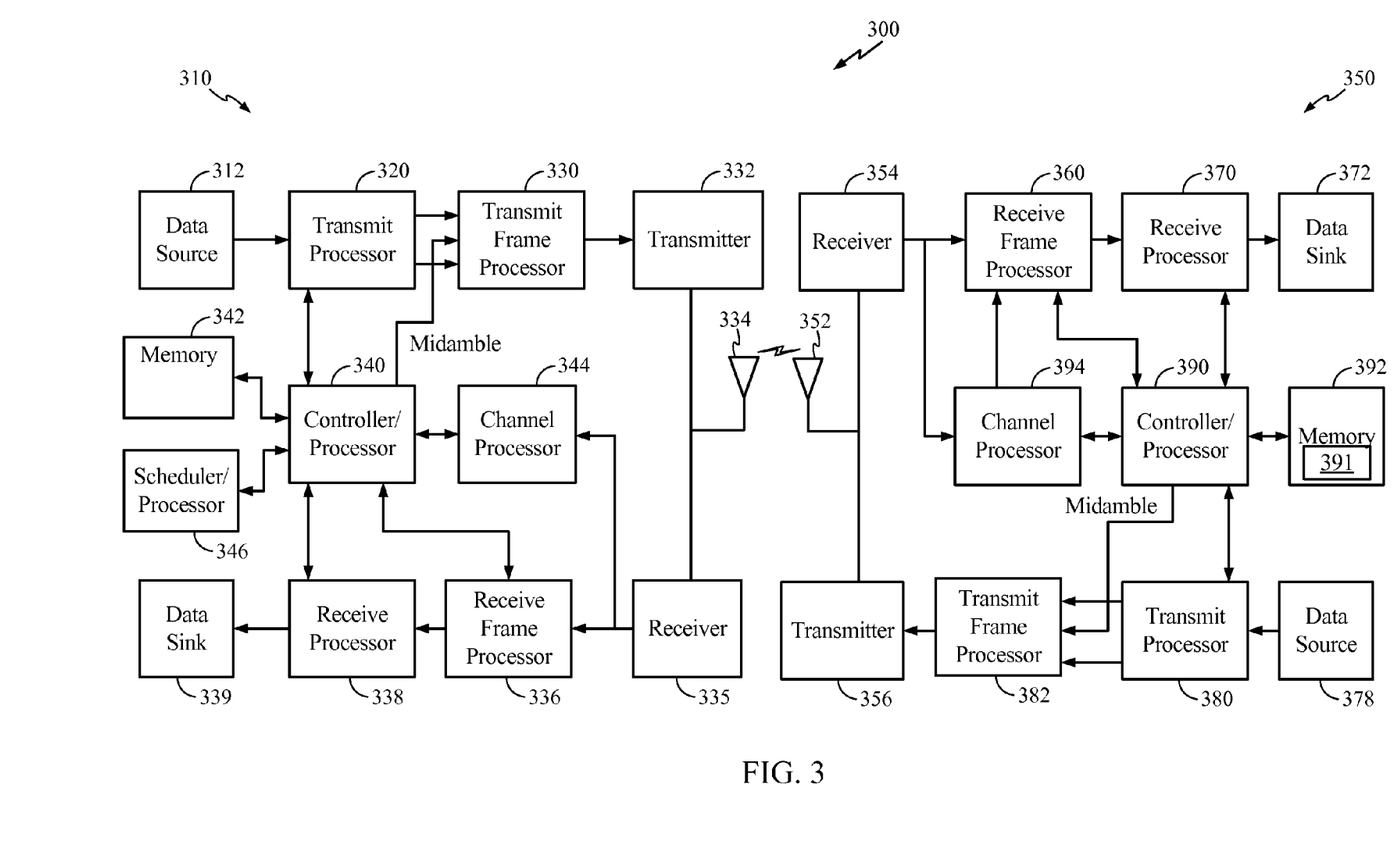
FIG. 3 is a block diagram conceptually illustrating an example of a node B in communication with a UE in a telecommunications system.

FIG. 3 is a block diagram of a node B 310 in communication with a UE 350 in a RAN 300, where the RAN 300 may be the RAN 102 in FIG. 1, the node B 310 may be the node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the node B 310. More specifically, the receive processor 370 descrambles and despreads the symbols, and then determines the most likely signal constellation points transmitted by the node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the node B 310 or from feedback contained in the midamble transmitted by the node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the node B 310 and the UE 350, respectively. For example, the memory 392 of the UE 350 may store a cell reselection module 391 which, when executed by the controller/processor 390, configures the UE 350 to adjust its control channel monitoring based on a physical layer indication received from a node B. A scheduler/processor 346 at the node B 310 may be used to allocate resources to the UEs and schedule downlink and/or uplink transmissions for the UEs.

Figure 4:
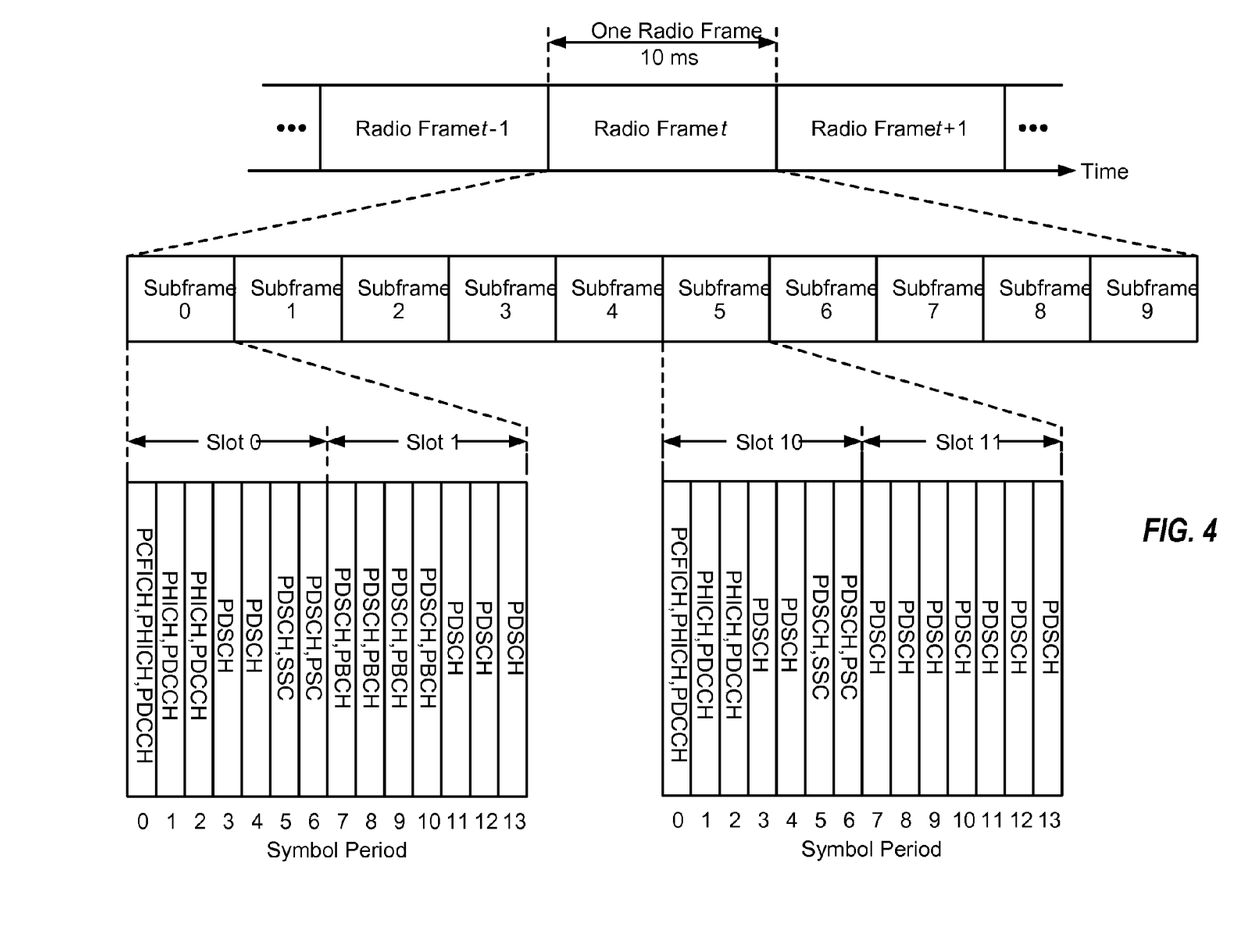
FIG. 4 is a diagram conceptually illustrating an example of a downlink frame structure in a telecommunications system.

FIG. 4 shows a downlink FDD frame structure used in Long Term Evolution (LTE) protocol communications. The transmission timeline for the downlink may be partitioned into units of radio frames. Each radio frame may have a predetermined duration (e.g., 10 milliseconds (ms)) and may be partitioned into 10 subframes with indices of 0 through 9.

Each subframe may include two slots. Each radio frame may thus include 20 slots with indices of 0 through 19. Each slot may include L symbol periods, e.g., 7 symbol periods for a normal cyclic prefix (as shown in FIG. 4) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, a base station (called an evolved Node B, or eNodeB) may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 4. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 4. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 4, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 5:
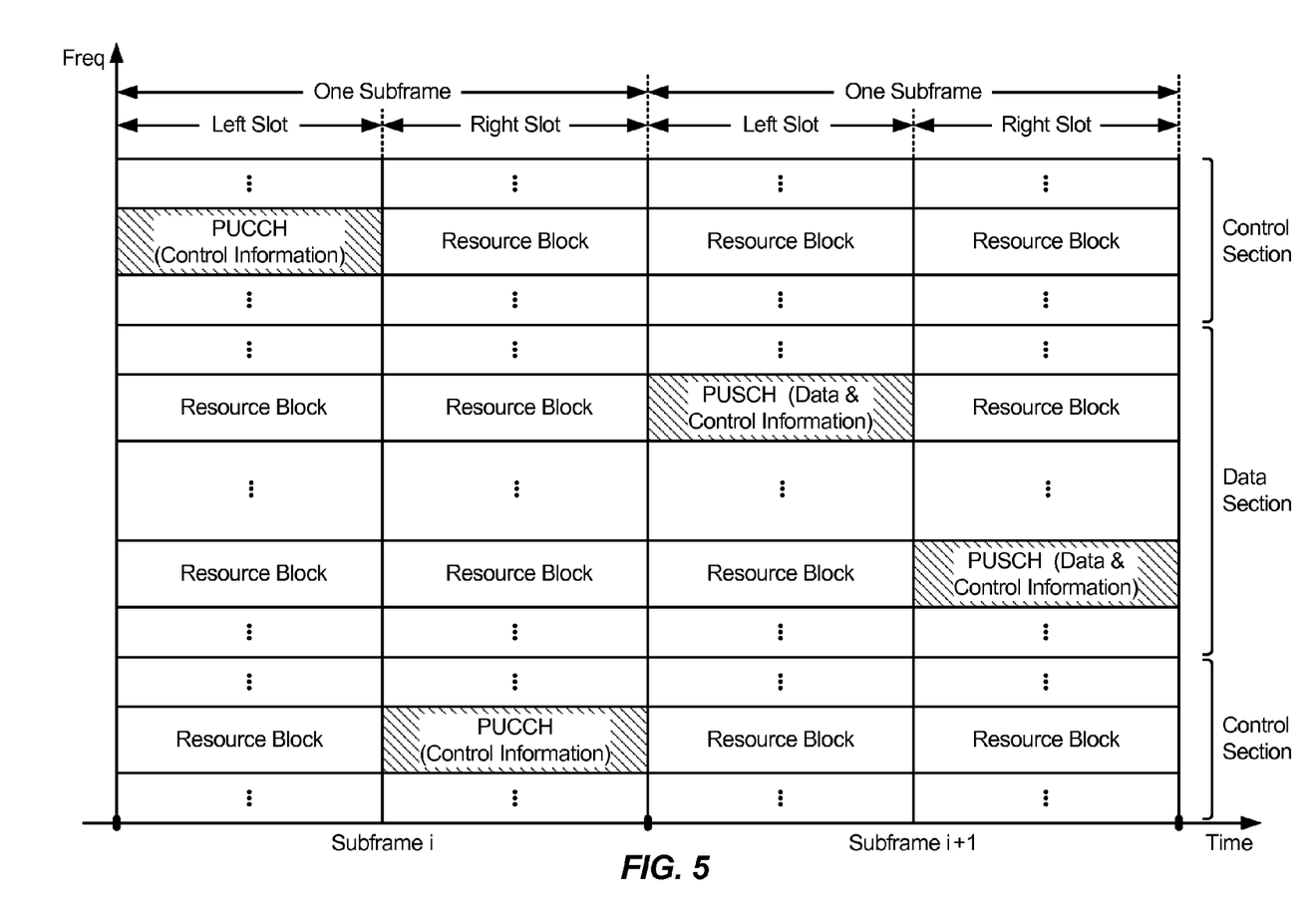
FIG. 5 is a block diagram conceptually illustrating an example frame structure in uplink communications.

FIG. 5 is a block diagram conceptually illustrating an exemplary FDD and TDD (non-special subframe only) subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 5 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 5. According to one aspect, in relaxed single carrier operation, parallel channels may be transmitted on the UL resources. For example, a control and a data channel, parallel control channels, and parallel data channels may be transmitted by a UE.

The PSC, SSC, CRS, PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 6:
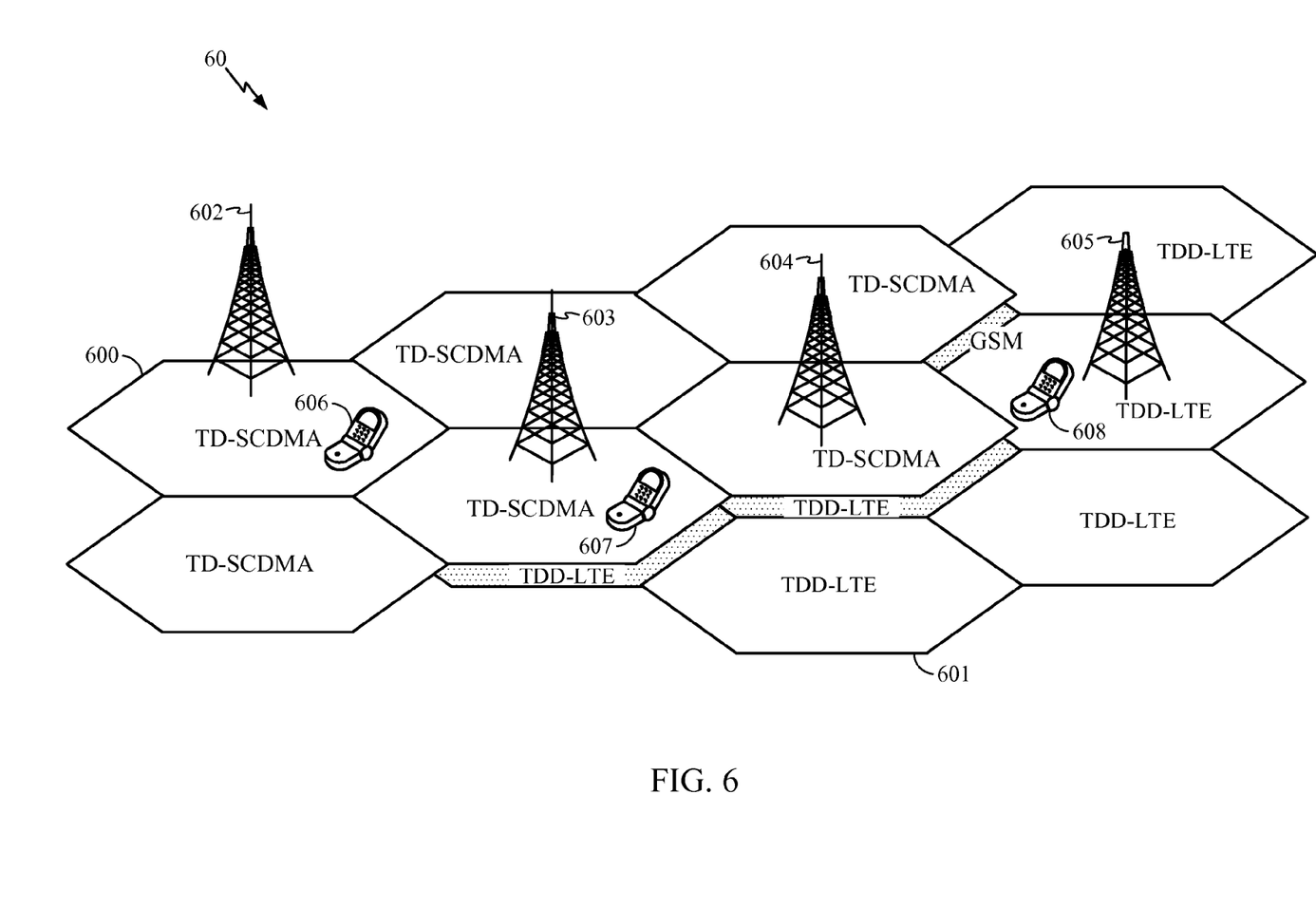
FIG. 6 is a diagram illustrating a mixed network that includes coverage areas of a TD-SCDMA network and a TDD-LTE network.

In the migration of TD-SCDMA radio access technology, UEs may encounter areas that have both TDD-LTE and TD-SCDMA coverage. FIG. 6 is a diagram illustrating a mixed network 60 that includes coverage areas of a TD-SCDMA network 600 and a TDD-LTE network 601. The mixed network 60 includes areas where there is dual coverage between the TD-SCDMA network 600 and the TDD-LTE network 601 and other areas where there is only coverage of the individual networks. The base stations 602-605 operate node Bs for the TD-SCDMA network 600 and eNode Bs the TDD-LTE network 601. For example, the base station 602 may operate a single node B for the TD-SCDMA network 600, while the base station 605 may operate a single eNode B for the TDD-LTE network 601. The base stations 603 and 604 may each operate one node B for the TD-SCDMA network 600 and an eNode B for the TDD-LTE network 601. UEs, such as the UE 607 within the coverage area of base station 603, may connect for communication through both or either of the TD-SCDMA network 600 and the TDD-LTE network 601, while UEs such as the UEs 606 and 608 within the coverage areas of the base stations 602 and 605, respectively, would only be able to connect for communication through either the TD-SCDMA network 600 (for the UE 606 through the base station 602) or the TDD-LTE network 601 (for the UE 608 through the base station 605).

Figure 7:
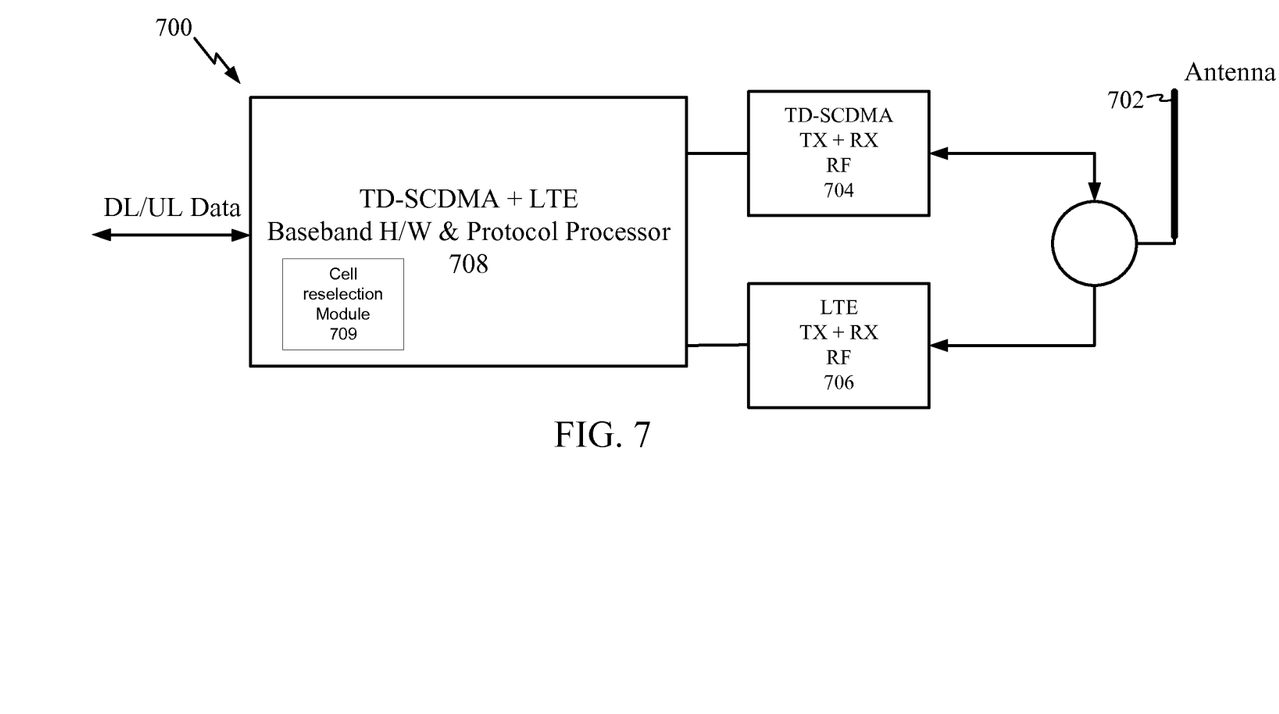
FIG. 7 is a block diagram illustrating a dual mode UE that may be used in implementing one aspect of the present disclosure.

In order for a UE, such as the UE 607, to connect to both the TD-SCDMA network 600 and the TDD-LTE network 601, the UE includes both hardware and software enabling it to establish communication with the protocols of both TD-SCDMA and TDD-LTE technologies. FIG. 7 is a block diagram illustrating a dual mode UE 700 that may used in implement one aspect of the present disclosure. Signals from and to any protocol are received and transmitted by the UE 700 through an antenna 702. TD-SCDMA protocol signals are then processed through a TD-SCDMA radio frequency (RF) processing section 704, which includes a transceiver with hardware and software specifically designed for processing transmit (Tx) and receive (Rx) communications using TD-SCDMA protocols. Similarly, TDD-LTE protocol signals are processed through a LTE radio frequency (RF) processing section 706, which includes a transceiver with hardware and software specifically designed for processing transmit (Tx) and receive (Rx) communications using TDD-LTE protocols. The resulting processed uplink and downlink data is left in a common protocol that may be further processed in a common baseband hardware (H/W) and software protocol processor 708. The processor 708 may include a cell reselection module 709 designed to perform the cell reselection as described here. The UE 700 may connect to either or both TD-SCDMA and TDD-LTE networks for communications, either separately or at the same time.

The UE may use TDD-LTE for packet-switched (PS) data service and TD-SCDMA for circuit-switched (CS) voice calls concurrently. However, if there is no available coverage of the TDD-LTE network, the TD-SCDMA network can also offer packet-switched data service. If the UE switches from TDD-LTE to TD-SCDMA for packet-switched service, the UE will perform cell reselection to determine which TD-SCDMA cell it should connect to for the packet-switched service. Similarly, if the UE switches from TD-SCDMA to TDD-LTE for packet-switched service, it will also perform cell reselection.

To support cell reselection between radio access technologies (inter-RAT cell reselection) the UE measures the signal of the serving cell, denoted by S_serv, and the signal of another neighbor cell of a different RAT, denoted by S_nonserv. Depending on the priority of the frequency/RAT where these cells are, the UE may reselect to a neighbor cell provided that the following cell reselection criteria are met:

If service cell has higher priority than the neighbor cell:
S_serv<Thres_low AND S_nonserv>Thres_high
If service cell has lower priority than the neighbor cell:
S_nonserv>Thres_high
If serving cell has the same priority as the neighbor cell:
S_serv+Qhyst<S_nonserv−Qoffset Cell reselection priority of a serving cell and neighbor cells may be configured by the network by broadcasting the system information messages to the cell. A priority may have a value between 0 to 7 with 0 being the lowest priority. Relative cell reselection priority between a serving cell and a neighbor cell effects which formula is used in evaluating cell reselection as shown in the above equations. The parameters Thres_low and Thres_high are used to set the low threshold and high threshold for the serving cell and neighbor cell signals, respectively, in order to perform inter-RAT cell reselection in non-equal priority cases. The parameters Qhyst and Qoffset are used to set a hysteresis and offset to perform equal-priority inter-RAT cell reselection.

Offered is a method to support cell reselection when the UE has simultaneous transmit and receive capability on both the TDD-LTE and TD-SCDMA networks and when the UE is already affiliated with a particular TD-SCDMA cell. When a UE is in circuit-switched operation on the TD-SCDMA network and packet-switched operation on the TDD-LTE network, if the UE is to switch to the TD-SCDMA network for packet-switched operation as well, the UE may look only to a currently camped or connected TD-SCDMA cell as the candidate for reselection to ensure both circuit-switched communications and packet-switched communications occur with the same TD-SCDMA cell. This will prevent the UE from connecting to two different TD-SCDMA cells, one for circuit-switched service and one for packet-switched service.

In this scenario, prior to cell reselection, the UE may be idle with regard to the TDD-LTE network and may either be idle or connected with an affiliated cell in the TD-SCDMA network. As used here, "idle" may include a UE being camped on a particular cell but not engaged in active exchange of data. As used here, "connected" means the cell is actively serving the UE. A UE may be idle or connected with an affiliated cell. If the UE is connected with the TDD-LTE network for a packet-switched call, cell reselection is not performed. The following cell reselection conditions are proposed when the UE is in circuit-switched operation on the TD-SCDMA network and packet-switched operation on the TDD-LTE network:

| Current state when CS in TD-SCDMA | Current state when PS in TDD-LTE | Can PS service perform cell reselection to TD-SCDMA? |
| --- | --- | --- |
| Idle | Idle | Yes, after cell reselection: CS with TD-SCDMA cell PS with same TD-SCDMA cell |
| Idle | Connected | No |
| Connected | Idle | Yes, after cell reselection: CS with TD-SCDMA cell PS with same TD-SCDMA cell |
| Connected | Connected | No |

When the UE is idle with TDD-LTE and idle or connected with TD-SCDMA and the UE is considering cell reselection to TD-SCDMA for packet-switched service. The UE only measures the signal of the currently camped or connected TD-SCDMA cell. The UE compares that signal with the currently camped TDD-LTE cell to verify the cell reselection criteria discussed above. If the cell reselection criteria are met, the UE discontinues communication with the TDD-LTE cell and performs a routing area update procedure to move packet-switched service to the same TD-SCDMA cell that is providing circuit switched service.

Figure 8:
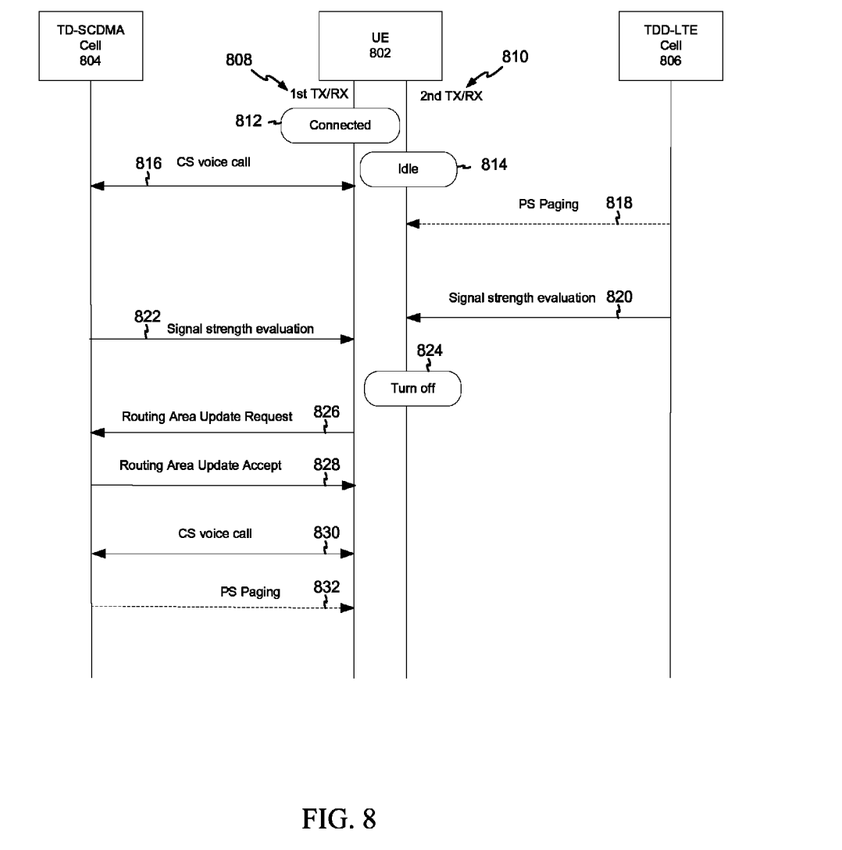
FIG. 8 is a call flow diagram illustrating a call flow occurring with a UE configured according to one aspect of the present disclosure.

FIG. 8 shows a call flow diagram illustrating cell reselection with a UE connected to a TD-SCDMA cell. As shown in FIG. 8, a UE 802 connects to a TD-SCDMA cell 804 for circuit-switched service with a first set of transmit/receive hardware 808 of the UE 802. The UE 802 connects to a TDD-LTE cell 806 for packet-switched service with a second set of transmit/receive hardware 810 of the UE 802. At time 812 the UE 802 is connected to the TD-SCDMA cell 804. At time 814 the UE 802 is idle but camped on to the TDD-LTE cell 806. At time 816 the UE 802 engages in a circuit-switched voice call with the TD-SCDMA cell 804. At time 818 the UE 802 may monitor a packet-switched paging from the TDD-LTE cell 806, though this paging is not necessary for cell reselection. At time 820 the UE 802 performs a signal strength evaluation with the TDD-LTE cell 806. At time 822 the UE 802 performs a signal strength evaluation with the TD-SCDMA cell 804, which is presently providing circuit-switched service for the UE 802. The UE 802 then determines whether cell reselection criteria are met. If they are, the UE 802 turns off its second set of transmit/receive hardware 810 at time 824, discontinuing communications with the TDD-LTE cell 806. The UE 802 then sends a routing area update request to the TD-SCDMA cell 804 at time 826 and receives the routing area update accept at time 828. The UE 802 can then continue with circuit-switched voice calls with the TD-SCDMA cell 804 as shown at time 830 while monitoring packet-switched paging at time 832 from the same TD-SCDMA cell 804, though this paging is illustrative only and is not necessary for cell reselection.

Figure 9:
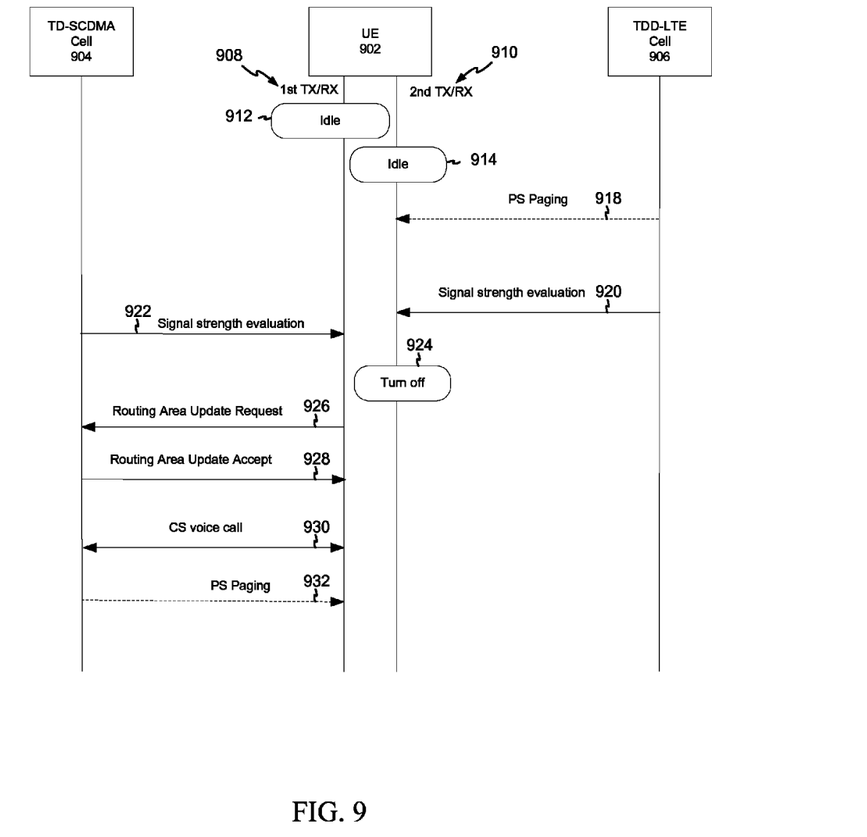
FIG. 9 is a call flow diagram illustrating a call flow occurring with a UE configured according to one aspect of the present disclosure.

FIG. 9 shows a call flow diagram illustrating cell reselection with a UE idle, but affiliated with a TD-SCDMA cell. As shown in FIG. 9, a UE 902 is idle, but camped on to a TD-SCDMA cell 904 for circuit-switched service with a first set of transmit/receive hardware 908 of the UE 902. The UE 902 camps on a TDD-LTE cell 906 for packet-switched service with a second set of transmit/receive hardware 910 of the UE 902. At time 912 the UE 902 is idle, but camped on to the TD-SCDMA cell 904. At time 914 the UE 902 is idle but camped on to the TDD-LTE cell 906. At time 918 the UE 902 may monitor a packet-switched paging from the TDD-LTE cell 906, though this paging is not necessary for cell reselection. At time 920 the UE 902 performs a signal strength evaluation with the TDD-LTE cell 906. At time 922 the UE 902 performs a signal strength evaluation with the TD-SCDMA cell 904, which is presently designated to provide circuit-switched service for the UE 902. The UE 902 then determines whether cell reselection criteria are met. If they are, the UE 902 turns off its second set of transmit/receive hardware 910 at time 924, discontinuing communications with the TDD-LTE cell 906. The UE 902 then sends a routing area update request with the TD-SCDMA cell 904 at time 926 and receives the routing area update accept at time 928. The UE 902 can then have any circuit-switched voice calls with the TD-SCDMA cell 904 as shown at time 930 while monitoring packet-switched paging at time 932 from the same TD-SCDMA cell 904, though this paging is illustrative only and is not necessary for cell reselection.

Figure 10:
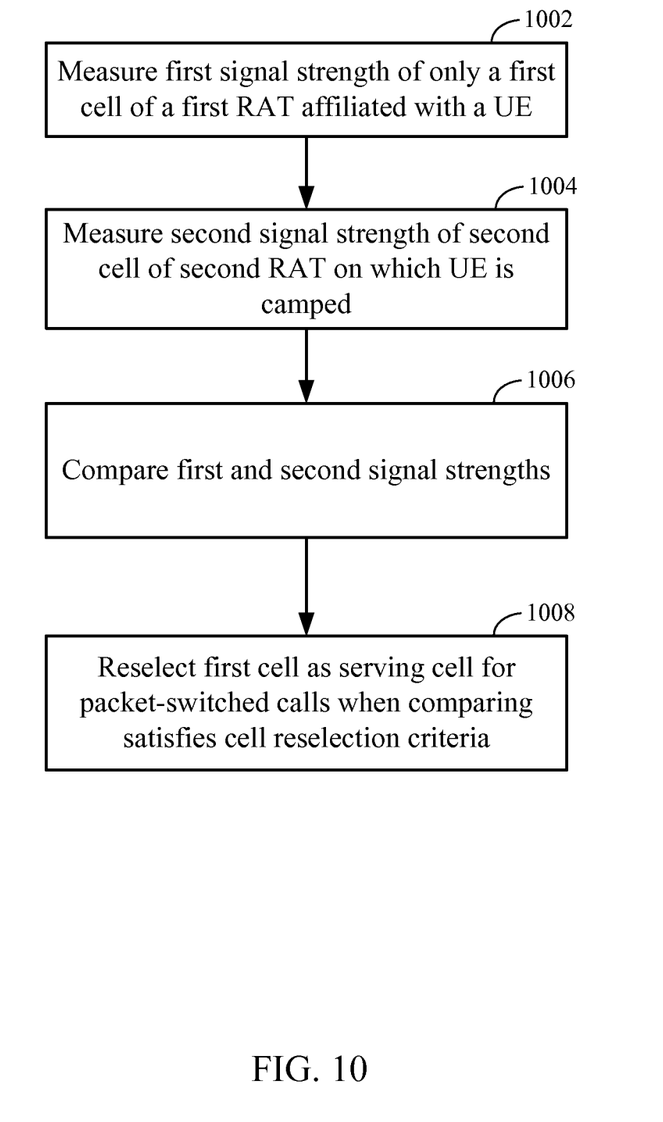
FIG. 10 is a diagram illustration cell reselection according to one aspect of the present disclosure.

FIG. 10 is a functional block diagram illustrating example blocks executed to implement one aspect of the present disclosure. In block 1002 a user equipment (UE) measures a first signal strength of only a first cell of a first radio access technology (RAT) affiliated with the UE. In block 1004 the UE measures a second signal strength of a second cell of a second radio access technology on which the UE is camped. In block 1006 the UE compares the first signal strength and the second signal strength. In block 1008 the UE reselects the first cell as the serving cell for packet-switched calls when the comparing satisfies cell reselection criteria.

In one configuration, the apparatus, for example the UE 350, for wireless communication includes means for measuring a first signal strength of only a first cell of a first radio access technology affiliated with a user equipment (UE). In one aspect, the aforementioned means may be the antenna 352, receiver 354, channel processor 394, controller/processor 390, and/or memory 392 configured to perform the functions recited by the aforementioned means. The UE 350 may also include means for measuring a second signal strength of a second cell of a second radio access technology on which the UE is camped. In one aspect, the aforementioned means may be the antenna 352, receiver 354, channel processor 394, controller/processor 390, and/or memory 392 configured to perform the functions recited by the aforementioned means. The UE 350 may also include means for comparing the first signal strength and the second signal strength. In one aspect, the aforementioned means may be the controller/processor 390, memory 392 and/or cell reselection module 391 configured to perform the functions recited by the aforementioned means. The UE 350 may also include means for reselecting the first cell as the serving cell for packet-switched calls when the comparing satisfies cell reselection criteria. In one aspect, the aforementioned means may be the controller/processor 390, memory 392 and/or cell reselection module 391 configured to perform the functions recited by the aforementioned means. In another aspect, the aforementioned means may be a module or any apparatus configured to perform the functions recited by the aforementioned means.

Several aspects of a telecommunications system has been presented with reference to TD-SCDMA and TDD-LTE systems. It is noted, however, that other systems, such as FDD LTE systems are also contemplated. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
    measuring a first signal strength of a first radio access technology (RAT) that is serving a user equipment (UE) for active circuit-switched communications via a first radio of the UE;
    measuring a second signal strength of a second RAT that is serving the UE for idle packet-switched communications via a second radio of the UE;
    comparing the first signal strength and the second signal strength;
    turning off the second radio of the UE when the comparing satisfies cell reselection criteria; and
    switching a serving cell for packet-switched communications from the second cell to the first cell when the comparing satisfies cell reselection criteria, the circuit-switched communications being maintained with the first cell after switching to the first cell as the serving cell for the packet-switched communications.

2. The method of claim 1 in which the switching comprises performing a routing area update procedure for packet-switched calls with the first cell.

3. The method of claim 1 in which:
    prior to switching:
        the UE monitors circuit-switched paging via the first cell or connects with the circuit-switched call via the first cell, and
        the UE monitors packet-switched paging from the second cell; and
    after reselecting:
        the UE monitors packet-switched paging via the first cell or connects with a packet-switched call via the first cell.

4. The method of claim 1 in which the first radio access technology comprises Time Division-Synchronous Code Division Multiple Access (TD-SCDMA) and the second radio access technology comprises Long Term Evolution (LTE).

5. The method of claim 4 in which the second radio access technology comprises frequency division duplexing LTE.

6. The method of claim 4 in which the second radio access technology comprises time division duplexing LTE.

7. An apparatus for wireless communication, comprising:
    means for measuring a first signal strength of a first radio access technology (RAT) that is serving a user equipment (UE) for active circuit-switched communications via a first radio of the UE;
    means for measuring a second signal strength of a second RAT that is serving the UE for idle packet-switched communications via a second radio of the UE;
    means for comparing the first signal strength and the second signal strength;
    means for turning off the second radio of the UE when the comparing satisfies cell reselection criteria; and
    means for switching a serving cell for packet-switched communications from the second cell to the first cell when the comparing satisfies cell reselection criteria, the circuit-switched communications being maintained with the first cell after switching to the first cell as the serving cell for the packet-switched communications.

8. The apparatus of claim 7 in which the means for switching comprises
    means for performing a routing area update procedure for packet-switched calls with the first cell.

9. The apparatus of claim 7 in which:
    prior to switching:
        the UE monitors circuit-switched paging via the first cell or connects with the circuit-switched call via the first cell, and
        the UE monitors packet-switched paging from the second cell; and
    after reselecting:
        the UE monitors packet-switched paging via the first cell or connects with a packet-switched call via the first cell.

10. The apparatus of claim 7 in which the first radio access technology comprises Time Division-Synchronous Code Division Multiple Access (TD-SCDMA) and the second radio access technology comprises Long Term Evolution (LTE).

11. A computer program product for wireless communication, the computer program product comprising:
 a non-transitory computer-readable medium having non-transitory program code recorded thereon, the program code comprising:
  program code to measure a first signal strength of a first radio access technology (RAT) that is serving a user equipment (UE) for active circuit-switched communications via a first radio of the UE;
  program code to measure a second signal strength of a second RAT that is serving the UE for idle packet-switched communications via a second radio of the UE;
  program code to compare the first signal strength and the second signal strength;
  program code to turn off the second radio of the UE when the comparing satisfies cell reselection criteria; and
  program code to switch a serving cell for packet-switched communications from the second cell to the first cell when the comparing satisfies cell reselection criteria, the circuit-switched communications being maintained with the first cell after switching to the first cell as the serving cell for the packet-switched communications.

12. The computer program product of claim 11 in which the program code further comprises
 program code to perform a routing area update procedure for packet-switched calls with the first cell.

13. The computer program product of claim 11 in which:
 prior to switching:
  the UE monitors circuit-switched paging via the first cell or connects with the circuit-switched call via the first cell, and
  the UE monitors packet-switched paging from the second cell; and
 after reselecting:
  the UE monitors packet-switched paging via the first cell or connects with a packet-switched call via the first cell.

14. The computer program product of claim 11 in which the first radio access technology comprises Time Division-Synchronous Code Division Multiple Access (TD-SCDMA) and the second radio access technology comprises Long Term Evolution (LTE).

15. An apparatus for wireless communication, the apparatus comprising:
 a memory; and
 at least one processor coupled to the memory, the at least one processor being configured:
  to measure a first signal strength of a first radio access technology (RAT) that is serving a user equipment (UE) for active circuit-switched communications via a first radio of the UE;
  to measure a second signal strength of a second RAT that is serving the UE for idle packet-switched communications via a second radio of the UE;
  to compare the first signal strength and the second signal strength;
  to turn off the second radio of the UE when the comparing satisfies cell reselection criteria; and
  to switch a serving cell for packet-switched communications from the second cell to the first cell when the comparing satisfies cell reselection criteria, the circuit-switched communications being maintained with the first cell after switching to the first cell as the serving cell for the packet-switched communications.

16. The apparatus of claim 15 in which the at least one processor is further configured
 to perform a routing area update procedure for packet-switched calls with the first cell.

17. The apparatus of claim 15 in which:
 prior to switching:
  the UE monitors circuit-switched paging via the first cell or connects with the circuit-switched call via the first cell, and
  the UE monitors packet-switched paging from the second cell; and
 after reselecting:
  the UE monitors packet-switched paging via the first cell or connects with a packet-switched call via the first cell.

18. The apparatus of claim 15 in which the first radio access technology comprises Time Division-Synchronous Code Division Multiple Access (TD-SCDMA) and the second radio access technology comprises Long Term Evolution (LTE).

19. The apparatus of claim 18 in which the second radio access technology comprises frequency division duplexing LTE.

20. The apparatus of claim 18 in which the second radio access technology comprises time division duplexing LTE.

* * * * *